Mar. 20, 1923.
R. H. ROBERTS
TIMBERWORK
Filed Mar. 30, 1921
1,448,768
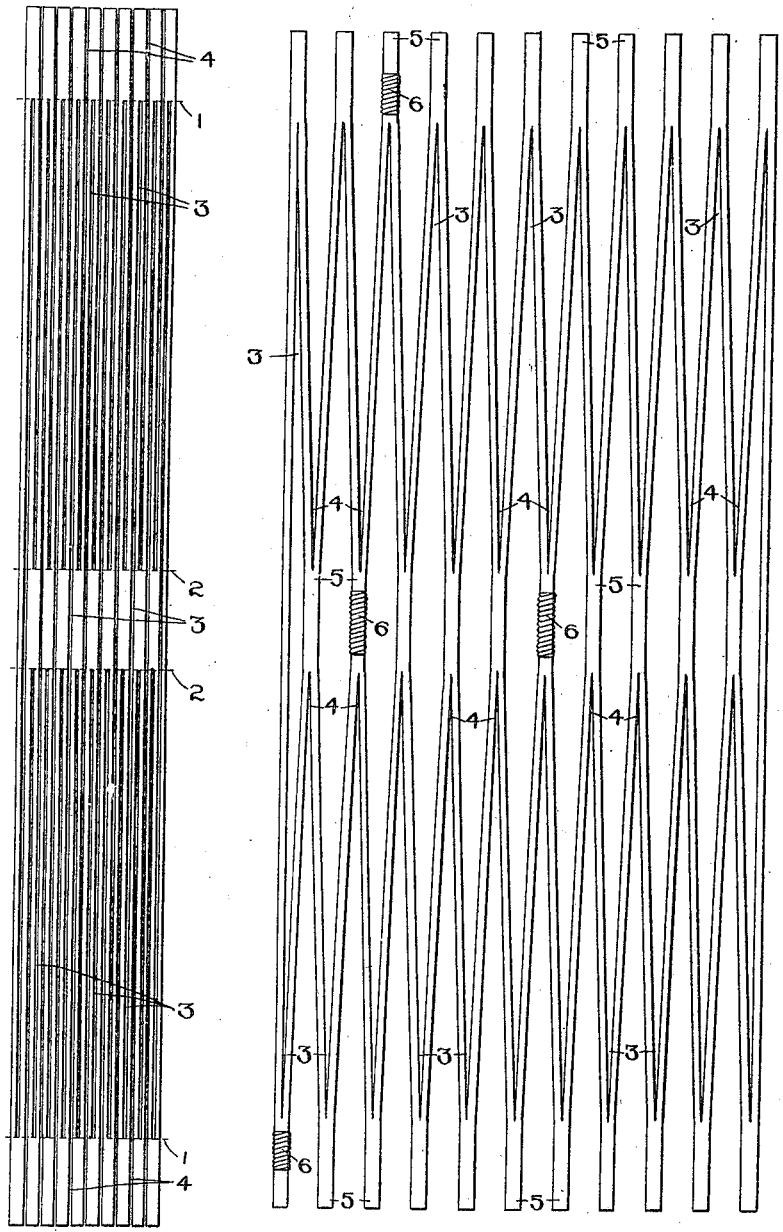
FIG_1_
FIG_2_
Inventor
R. H. Roberts
By Marks Clerk
Attys Patented Mar. 20, 1923.

1,448,768

UNITED STATES PATENT OFFICE.

RICHARD HENRY ROBERTS, OF HENDERSON, AUCKLAND, NEW ZEALAND, ASSIGNOR TO ROBERTS EXPANDING LATTICE COMPANY LIMITED OF AUCKLAND, OF AUCKLAND, NEW ZEALAND.

TIMBERWORK.

Application filed March 30, 1921. Serial No. 456,869.

(GRANTED UNDER THE PROVISIONS OF THE ACT OF MARCH 3, 1921, 41 STAT. L., 1313.)

*To all whom it may concern:*

Be it known that I, RICHARD HENRY ROBERTS, a citizen of the Dominion of New Zealand, and residing at "Farnley Tyas," Te Atatu Road, Henderson, Auckland, in the Provincial District of Auckland, New Zealand, a subject of the King of Great Britain and Ireland, have invented certain new and useful Improvements in Timberwork (for which I have filed application in New Zealand, No. 42726, filed the 18th of November, 1919, which matured into a patent the sealing date of which is June 30, 1921), of which the following is a specification.

This invention relates to lattice work, and provides an improvement whereby a solid board, can be expanded to provide lattice work in the one piece, instead of lattice work constructed of separate pieces or battens secured together by fastenings, as is done at present, According to the invention the board of suitable length and width is chosen, and lines are drawn across same, one near each end.

Lines are also drawn across the board one on each side of the latter's centre.

A series of parallel saw cuts are then made lengthways in the board, said cuts extending from the line near one end of the board to the line near the other end.

Other parallel saw cuts are then made from each end of the board to the lines across same near the centre thereof, each of said last mentioned saw cuts passing between two of the first mentioned saw cuts.

Owing to the saw cuts thus made, the board can then be expanded or extended to provide lattice work.

In the accompanying drawing:—

Figure 1 illustrates a board with the saw cuts therein, and

Figure 2 shows the same board expanded.

A line 1 is drawn across the board near each end and lines 2 are drawn across the board near the centre thereof and one at each side of the latter.

Parallel saw cuts 3 are then made in the board said saw cuts 3 extending from the line 1 near one end of the board to the line 1 near the other end of the board.

Further saw cuts 4 are then made between the saw cuts 3, said saw cuts 4 extending from each end of the board to a line 2. Each saw cut 4 is located between two of the saw cuts 3.

The saw cuts 3 and 4 made in the board in the manner above described, have the effect of making the board so pliant that it can be extended and expanded to form lattice work as shown in Figure 2.

The saws used in doing this work are preferably held in sets or gauges, and the gauge is first set in the saw bench so that when the board is dropped over the saws they will make the cuts 3, after which the cuts 4 are made from each end and between the cuts 3, to near the centre of the board.

As a means of strengthening the lattice, the solid portions 5 at the ends of the saw cuts 3 and 4, can be bound with wire 6 or hoop iron or the like, as a safeguard against splitting.

The height of the lattice can be as desired, and the series of cuts 3 and 4 can be repeated in the length of the board as often as is necessary.

This form of lattice lends itself to being decorated by inserting ornamental parting pieces at the top and bottom and in the centre of openings, which pieces also strengthen the lattice.

The thickness of the lattice depends upon the use it is put to and if thick timber is employed the latter is steamed after the saw cuts have been made in order to facilitate the expansion of the board.

By making lattice in the manner above described considerable time and labour is saved, besides which no fastenings are required, the whole being cut and formed in the one piece.

What I do claim and desire to obtain by Letters Patent of the United States is:—

A board having series of cuts made therein, certain of the cuts extending inwardly from the ends thereof to points adjacent the center and other cuts extending longitudinally of the board from points inwardly of the ends thereof whereby the board may be expanded to form lattice work, and reinforcing means wrapped about and completely embracing the solid portions of the board at the extremities of the cuts to reinforce the board at the bases of the flexures and thereby prevent splitting in any direction, said reinforced means being so disposed as to permit unrestricted expanding and contracting movements of the board.

In testimony whereof I affix my signature in presence of two witnesses.

RICHARD HENRY ROBERTS.

Witnesses:
 WILLIAM PRINCHES,
 MARY PICKINGTON.